United States Patent
Chintalapudi et al.

(10) Patent No.: US 12,323,212 B2
(45) Date of Patent: Jun. 3, 2025

(54) SYSTEMS AND METHODS FOR PROACTIVE WIRELESS COMMUNICATION RATE ADAPTATION

(71) Applicant: Microsoft Technology Licensing, LLC, Redmond, WA (US)

(72) Inventors: Krishna Kant Chintalapudi, Remond, WA (US); Hao Yin, Seattle, WA (US); Perry Victor Lea, Eagle, ID (US); Gopala Srihari Narlanka, Bellevue, WA (US); Stanley William Adermann, Redmond, WA (US); Joseph Michael Schaefer, Carnation, WA (US); Ranveer Chandra, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 476 days.

(21) Appl. No.: 17/721,952

(22) Filed: Apr. 15, 2022

(65) Prior Publication Data
US 2023/0336228 A1 Oct. 19, 2023

(51) Int. Cl.
| | |
|---|---|
| H04B 7/06 | (2006.01) |
| H04B 17/336 | (2015.01) |
| H04L 1/00 | (2006.01) |
| H04W 24/10 | (2009.01) |
| H04W 28/16 | (2009.01) |
| H04W 28/18 | (2009.01) |
| H04W 28/22 | (2009.01) |
| H04W 72/542 | (2023.01) |

(52) U.S. Cl.
CPC ......... *H04B 7/0632* (2013.01); *H04B 7/0626* (2013.01); *H04B 17/336* (2015.01);
(Continued)

(58) Field of Classification Search
CPC .. H04B 7/0632; H04B 7/0626; H04B 17/336; H04L 1/0003; H04L 1/0009;
(Continued)

(56) References Cited

U.S. PATENT DOCUMENTS

| | | | | |
|---|---|---|---|---|
| 9,521,579 | B1 * | 12/2016 | Mudulodu | ............ H04L 1/0009 |
| 2007/0189199 | A1 * | 8/2007 | Nishio | .................... H04L 5/023 370/328 |

(Continued)

FOREIGN PATENT DOCUMENTS

WO 2021101347 A1 5/2021

OTHER PUBLICATIONS

"International Search Report and Written Opinion Issued in PCT Application No. PCT/US23/016004", Mailed Date: Jun. 19, 2023, 15 Pages.
(Continued)

*Primary Examiner* — Jay P Patel
(74) *Attorney, Agent, or Firm* — Rainier Patents, P.S.

(57) ABSTRACT

A method of managing wireless communication between electronic devices includes, at a first electronic device, transmitting a first downlink transmission from the first electronic device to a second electronic device and receiving a first response from the second electronic device at the first electronic device, wherein the first response includes a downlink channel quality information (CQI). The method further includes determining a per-subcarrier CQI based at least partially on the downlink CQI and determining an output modulation and coding scheme (MCS) based at least partially on the per-subcarrier CQI. After determining the output MCS, the method includes selecting a selected MCS based at least partially on the output MCS and setting an MCS of the first electronic device to the selected MCS.

20 Claims, 9 Drawing Sheets

(52) U.S. Cl.
CPC ........... *H04L 1/0003* (2013.01); *H04W 24/10* (2013.01); *H04W 28/16* (2013.01); *H04W 28/18* (2013.01); *H04W 28/22* (2013.01); *H04W 72/542* (2023.01)

(58) Field of Classification Search
CPC .... H04L 1/0015; H04L 1/0026; H04W 24/10; H04W 28/16; H04W 28/18; H04W 28/22; H04W 72/542; G06N 3/08; G06N 20/00
See application file for complete search history.

(56) References Cited

U.S. PATENT DOCUMENTS

| | | | | |
|---|---|---|---|---|
| 2009/0022137 | A1* | 1/2009 | Aghili | H04L 1/009 370/349 |
| 2009/0279419 | A1* | 11/2009 | To | H04L 1/0026 370/208 |
| 2020/0374858 | A1* | 11/2020 | Vargas | H04W 72/20 |
| 2021/0321339 | A1* | 10/2021 | Lee | H04W 52/286 |
| 2022/0060291 | A1* | 2/2022 | Yang | H04L 1/1607 |
| 2023/0090593 | A1* | 3/2023 | Kim | H04L 1/00 370/252 |
| 2024/0031841 | A1* | 1/2024 | Borsos | H04W 16/18 |
| 2024/0236776 | A1* | 7/2024 | Gupta | H04W 36/0069 |
| 2024/0380465 | A1* | 11/2024 | Lee | H04B 7/0626 |

OTHER PUBLICATIONS

Saxena, et al., "Deep Learning for Frame Error Probability Prediction in BICM-OFDM Systems", In Proceedings of IEEE International Conference on Acoustics, Speech and Signal Processing, Apr. 15, 2018, pp. 6658-6662.

* cited by examiner

SYSTEMS AND METHODS FOR PROACTIVE WIRELESS COMMUNICATION RATE ADAPTATION

BACKGROUND

Background and Relevant Art

Accessory devices communicate with a host device to send and receive information from a host application. Electromagnetic interference and traffic, as well as environmental conditions, can change available transmission carriers, channels, and transmission rates between the host device and the accessory device.

BRIEF SUMMARY

In some embodiments, a method of managing wireless communication between electronic devices includes, at a first electronic device, transmitting a first downlink transmission from the first electronic device to a second electronic device and receiving a first response from the second electronic device at the first electronic device, wherein the first response includes a downlink channel quality information (CQI). The method further includes determining a per-subcarrier CQI based at least partially on the downlink CQI and determining an output MCS based at least partially on the per-subcarrier CQI. After determining the output MCS, the method includes selecting a selected modulation and coding scheme (MCS) based at least partially on the output MCS and setting an MCS of the first electronic device to the selected MCS.

In some embodiments, a method of managing wireless communication between electronic devices, at a first electronic device, receiving a first uplink transmission from a second electronic device at the first electronic device, wherein the first uplink transmission includes an uplink CQI and determining a per-subcarrier CQI based at least partially on the uplink CQI. The method further includes determining an output MCS based at least partially on the per-subcarrier CQI, selecting a selected MCS of the second electronic device based at least partially on the output MCS, and transmitting a downlink transmission from the first electronic device to the second electronic device to change an MCS of the second electronic device to the selected MCS.

In some embodiments, an electronic device includes a processor, a wireless communication device in data communication with the processor, and a hardware storage device in data communication with the processor. The hardware storage device has instructions stored thereon that, when executed by the processor, cause the electronic device to transmit a first downlink transmission from the electronic device to a second electronic device and receive a first response from the second electronic device at the electronic device, wherein the first response includes a downlink CQI. The instructions further cause the electronic device to determine a per-subcarrier CQI based at least partially on the downlink CQI and determine an output MCS based at least partially on inputting the per-subcarrier CQI to an ML model. The instructions further cause the electronic device to select a selected MCS based at least partially on the output MCS and set the MCS of the first electronic device to the selected MCS.

This Summary is provided to introduce a selection of concepts in a simplified form that are further described below in the Detailed Description. This Summary is not intended to identify key features or essential features of the claimed subject matter.

Additional features and advantages will be set forth in the description which follows, and in part will be obvious from the description, or may be learned by the practice of the teachings herein. Features and advantages of the disclosure may be realized and obtained by means of the instruments and combinations particularly pointed out in the appended claims. Features of the present disclosure will become more fully apparent from the following description and appended claims or may be learned by the practice of the disclosure as set forth hereinafter.

BRIEF DESCRIPTION OF THE DRAWINGS

In order to describe the manner in which the above-recited and other features of the disclosure can be obtained, a more particular description will be rendered by reference to specific embodiments thereof which are illustrated in the appended drawings. For better understanding, the like elements have been designated by like reference numbers throughout the various accompanying figures. While some of the drawings may be schematic or exaggerated representations of concepts, at least some of the drawings may be drawn to scale. Understanding that the drawings depict some example embodiments, the embodiments will be described and explained with additional specificity and detail through the use of the accompanying drawings in which:

FIG. 7-1 is a schematic representation of a machine learning (ML) model, according to at least some embodiments of the present disclosure;

FIG. 7-2 is a table illustrating testing results of using the ML model of FIG. 7-1, according to at least some embodiments of the present disclosure;

DETAILED DESCRIPTION

The present disclosure generally relates to systems and methods for communicating data wirelessly between electronic devices. In some embodiments, systems and methods according to the present disclosure relate to communicating data wirelessly between a host device and an accessory device. In some embodiments, the accessory device is an electronic device that communicates data with the host devices for processing of the data at the host device. A variety of accessory devices including different radios and capabilities may be in data communication with the host device at a single time.

A user interacts with the accessory device to provide inputs to the host device and/or receive information from the host device. For example, an accessory device such as a game controller may receive manual inputs from the user on one or more buttons, switches, sticks, etc. and relay the state data to the host device. In another example, an accessory device such as a headset may receive audio data from the host device and play audio sounds to the user. In at least one example, the accessory device is a game controller that both transmits state data (related to user inputs) and chat audio data (collected by the game controller) to the host device and receives game haptic data and/or game audio data from the host device, which may be subsequently generated for the user by the accessory device.

In some instances, the radio frequency (RF) space in which the host device and accessory device(s) communicate changes with time. The channel quality is affected by the physical relationship of the radio of the host device and the radio accessory device, as well as the presence of other radios and/or other objects in the environment that may adversely impact the transmission of electromagnetic signals through the environment. For example, a user may physically move an accessory device relative to the host device. In another example, another radio may move or transmit in the RF space, producing interference on the same channels or frequencies. In another example, a person may walk between the host device and the accessory device. In a particular example, a user is holding a game controller while playing a video game, and the user moves the game controller relative to the host device (e.g., the game console) in both translation and rotation, while other devices, such as the user's computer, tablet, or smartphone generate additional traffic in the RF space.

In some embodiments, systems and methods according to the present disclosure allow for communications between the host device and the accessory device to transmit channel quality information (CQI) periodically and/or with each communication. In some embodiments, the CQI allows the host device and/or the accessory device to proactively change a modulation and coding scheme (MCS) for subsequent transmissions to provide communications with lower latency, higher reliability, lower power consumption, or combinations thereof.

Figure 1:
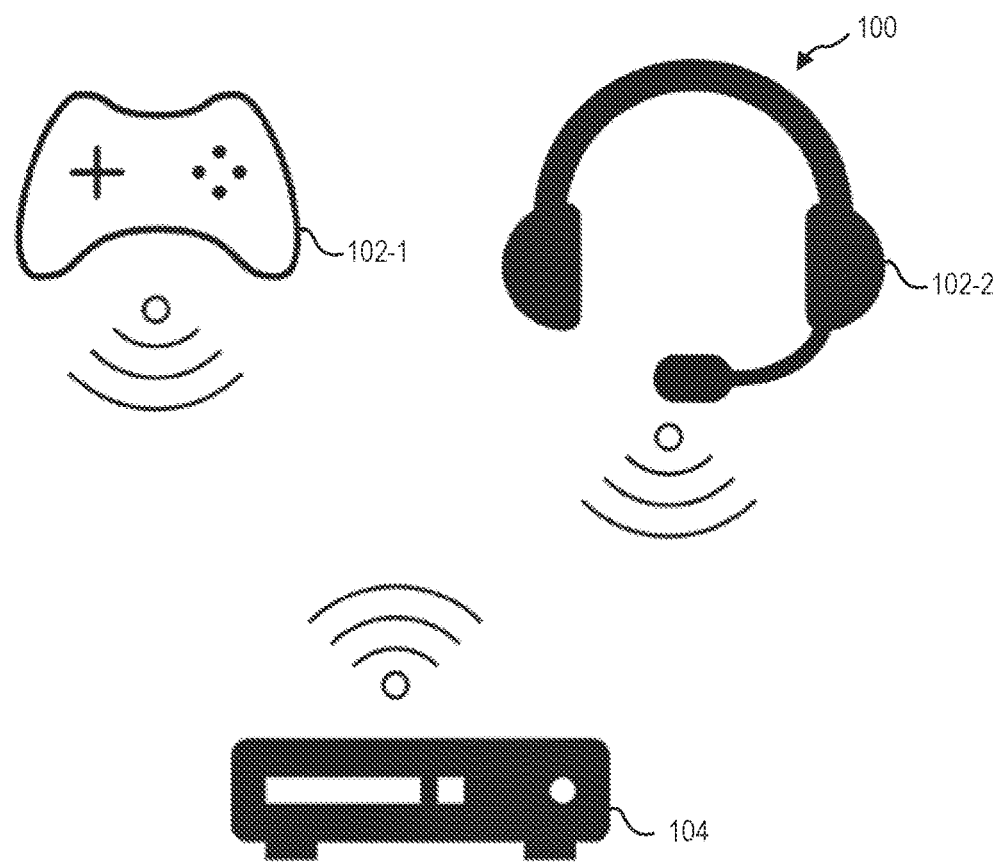
FIG. 1 is a schematic representation of a wireless communication system, according to at least some embodiments of the present disclosure.

FIG. 1 illustrates an example system 100 of accessory devices 102-1, 102-2 communicating with a host device 104. A plurality of accessory devices, such as game controllers, speakers, headsets, keyboards, joysticks, and other human interface devices (HID) pair to a host device and share a bandwidth for communication with the host device through time multiplexing.

In some embodiments, an accessory device 202 includes a processor 206 in communication with a hardware storage device 208. The hardware storage device 208 can be any non-transient computer readable medium that may store instructions thereon. The hardware storage device 208 may be any type of solid-state memory; volatile memory, such as static random access memory (SRAM) or dynamic random access memory (DRAM); non-volatile memory, such as read-only memory (ROM) including programmable ROM (PROM), erasable PROM (EPROM) or EEPROM; magnetic storage media, such as magnetic tape; a platen-based storage device, such as hard disk drives; optical media, such as compact discs (CD), digital video discs (DVD), Blu-ray Discs, or other optical media; removable media such as USB drives; non-removable media such as internal SATA or non-volatile memory express (NVMe) style NAND flash memory; or any other non-transient storage media. The hardware storage device 208 includes instruction stored thereon that, when executed by the processor 206, cause the accessory device 202 to perform any method or part of a method described herein.

The accessory device 202 further includes a wireless communication device 210, such as a 802.11ax RF transceiver or an 802.11n RF transceiver, that allows wireless transmission and receipt of data to the host device and/or control device. In some embodiments, the accessory device 202 has a plurality of wireless communication devices 210 that provide communication at different frequencies or power levels to communicate with different host devices and/or control devices.

The data channel provides communication of state data, audio data, and other frequent communications between the accessory device 202 and a host device. In some embodiments, the accessory device 202 also communicates with the host device to provide instructions to the accessory device 202. In some embodiments, the communications between the accessory device 202 and the host device may broadcast CQI, such as channel state information (CSI), signal-to-noise ratio (SNR), RSSI signal strength, latency information, or other information relevant to the quality of the data transmission on the channel. In some embodiments, the accessory device has at least one input mechanism 212 locally on the accessory device 202. In embodiments with a control channel, the control channel allows for the communication of latency-tolerant data transmission, while the data channel handles latency-critical information.

As the data channel handles latency-critical information, additional accessory devices sharing the bandwidth may create delays in transmission due to time multiplexing. In a conventional wireless communication system, a first electronic device (e.g., a host device) transmits to a second electronic device (e.g., an accessory device), and, upon receipt of the transmission, the second electronic device transmits an acknowledgment back to the first electronic device. The first electronic device communicates with the second electronic device to select the highest MCS supported by both of the electronic devices to provide the fastest transmissions therebetween. When a transmission fails, no acknowledgement is received at the first electronic device, and the first electronic device will, conventionally, decrease the MCS to retransmit the transmission with a slower MCS, which is more reliable and robust than a higher MCS.

Figure 3:
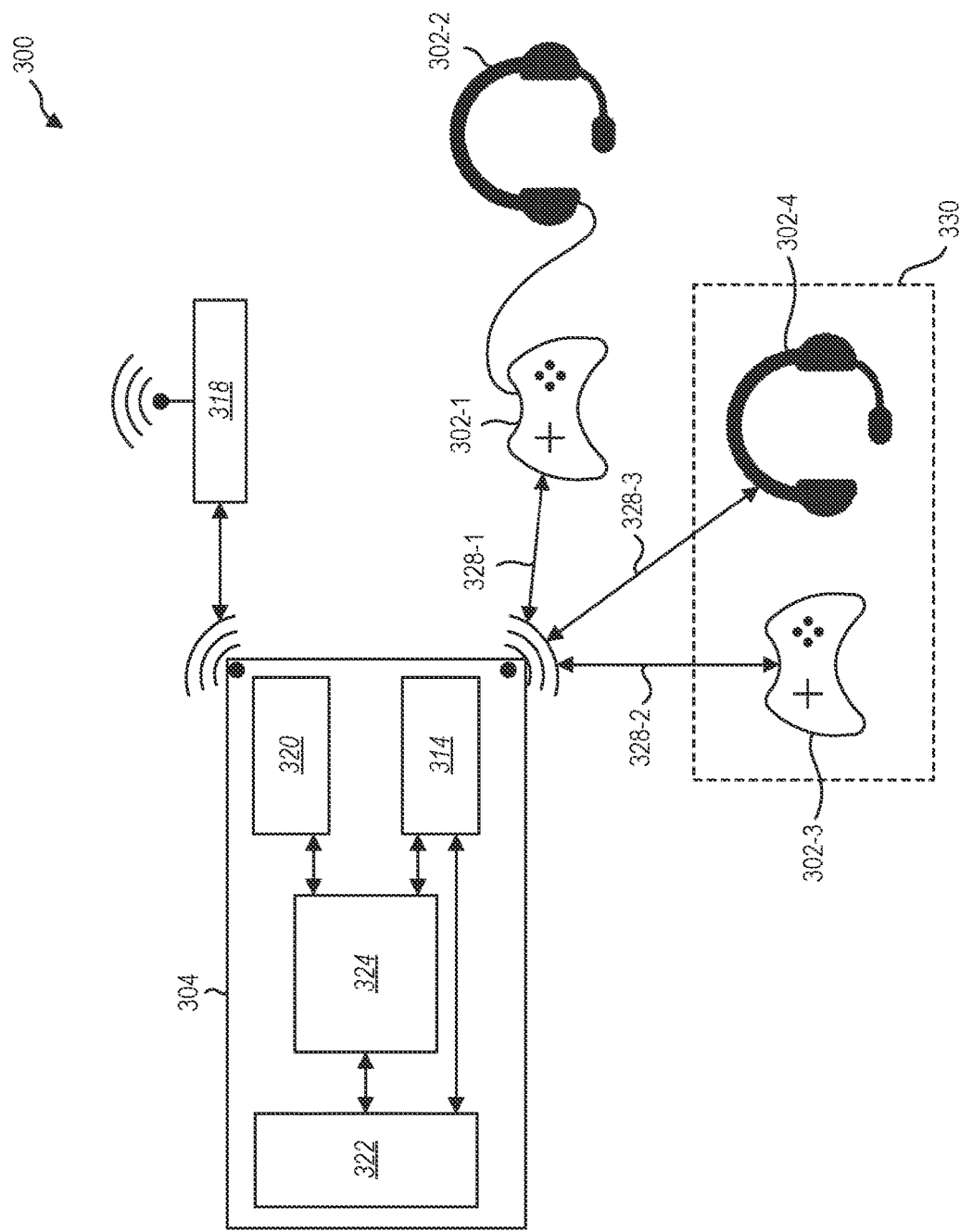
FIG. 3 is a schematic representation of wireless communication channels, according to at least some embodiments of the present disclosure.

Referring now to FIG. 3, an embodiment of a system 300 is illustrated with a host device 304 (e.g., a game console) in communication with a first accessory device 302-1 via an accessory radio 314. The host device 304 is also in data communication with a network 316 through an access point 318 via a network radio 320. A main processor or main SOC 322 of the host device 304 is indirectly connected to the network radio 320 and accessory radio 314 on the through Peripheral Component Interconnect Express (PCIe) or another hardware connection standard. In some embodiments, the main SOC 322 includes a hardware storage device with instructions stored thereon that, when executed by a processor, cause the host device to perform any method or part of method described herein. In other embodiments, the host device 302 includes a hardware storage device in data communication with the main SOC 322 or processor with instructions stored thereon that, when executed by a processor, cause the host device 302 to perform any method or part of method described herein.

The Low Power Radio Control ASIC 324 is a device that provides a PCIe pass-through using a non-transparent bridge topology when operating normally. In a low power state (e.g., regulatory-standby), the main SOC 322 will be powered off and network control will be managed by the low power radio control ASIC 324. In this state, the PCIe link will not be used as a pass-through to the main SOC 322, rather the low power radio control ASIC 324 will manage all network connectivity. The low power radio control ASIC 324 may manage wake events and filter network traffic while also ensuring network functionality is maintained. The low power radio control ASIC 324 may use a processor and embedded SRAM or other memory to host enough of the network functionality to respond to certain events and wake the main SOC 322. During a low power mode, the accessory radio 314 may not be managed by the low power radio control ASIC 324. Waking a console in a low power state from the first accessory device 302-1 will rely on the accessory radio 314 responding to a wake signal or beacon from the accessory device 302 and then alerting the main SOC 322 via an in-band or out-of-band signal to wake.

In some embodiments, the host device 302 establishes a first data channel 326-1 between the first accessory device 302-1 (and wireless communication device thereof) and the accessory radio 314 of the host device 304. The first data channel 326-1 carries latency-sensitive information between the first accessory device 302-1 and the host device 304 to provide the user with responsive and immersive interaction with a host application running on (or accessed through) the host device 304. For example, some game consoles or personal computers can render game applications and the game environments thereof at framerate at or above 120 frames per second. In such examples, each frame lasts only 8.33 milliseconds (ms). In another example, a game environment rendered at 60 FPS has a 16.67 ms frame time. Delays in communications over the data channel 326-1 can therefor cause inputs to be received after the intended state of the game environment. In a particular example, a 30 ms delay in communicating a user input can cause the user input to arrive at the host device 304 two to three frames after the button is pressed by the user.

In conventional systems using time multiplexing, additional devices using the frequencies of the first data channel 326-1 can cause traffic or congestion on the first data channel 326-1 that slows the transmission of the data. For example, multiple accessory devices sharing the bandwidth for data channels with the accessory radio 314 can cause additional delays. In other examples, devices or radios broadcasting on the same frequency that are not part of the system 300 can cause additional delays in communication. For at least this reason, reliable transmissions that minimize the transmission time and retransmissions of data improve performance of the individual communications, as well as the communications of the system, as a whole.

The first accessory device 302-1 transmits user input data, such as input device state data, to the host device 304 via the first data channel 326-1. In some embodiments, the first accessory device 302-1 is in wired data communication with a second accessory device 302-2. The host device 304 communicates other data, such as game audio data, to the first accessory device 302-1 to be subsequently transmitted to the second accessory device 302-2 via the first accessory device 302-1. The first accessory device 302-1 is also configured to receive data from the second accessory device 302-2, such as chat audio data, to be wirelessly transmitted to the host device 304 via the first data channel 326-1. In some embodiments, the first data channel 326-1, therefore, is used to communicate additional different types of data for two different accessory devices (i.e., the first accessory device 302-1 and second accessory device 302-2). The different types of data may have different priorities and/or latency dependencies.

In some embodiments, the first accessory device 302-1 is in wireless data communication with the second accessory device 302-2. A relay transmission may be received by the first accessory device 302-1 from the host device 304 and relayed by the first accessory device 302-1 to the second accessory device 302-2. In some embodiments, the relay transmission is transmitted by the first accessory device 302-1 to the second accessory device 302-2 with a different transmission policy than that used by the host device to transmit the relay transmission to the first accessory device 302-1. In some embodiments, the different transmission policy includes a different modulation and coding scheme (MCS) index.

In some embodiments, a third accessory device 302-3 is in wireless data communication with the host device 304 via the accessory radio 314 while a fourth accessory device 302-4 is also in wireless data communication with the host device 304 via the accessory radio 314. The third accessory device 302-3 and fourth accessory device 302-4 illustrate an embodiment of a hub-spoke model for network topology. A hub-spoke model for a system 300 requires the establishment of a different data channel for each accessory device 302-3, 302-4 with the host device 304. The third accessory device 302-3 and fourth accessory device 302-4 are associated as a pairing 330 that have associated information, such as haptic information sent to the third accessory device 302-3 via the second data channel 326-2 and game audio information, which is intended to be synchronized to the haptic information, is sent to the fourth accessory device 302-4 via the third data channel 326-3.

In other embodiments, a mesh-type network allows the third accessory device 302-3 to act as a node relay to the fourth accessory device 302-4 (e.g., a game controller acting as a node relay to a headset). In some embodiments, a mesh introduces latency and complications in mesh routing, mesh security, and mesh reliability. A mesh also complicates predictable and sustained bandwidth quality of service. However, a hub-spoke model introduces many individual data channels to communicate with the host device 304. A game console may communicate with 8 or more accessory devices (e.g., accessory devices 302-1, 302-2, 302-3, 302-4, etc.) located in a small area in the example of local or "couch" multiplayer events. In such examples, conventional time-based multiplexing or wait-to-talk communication can introduce delays, which increase with the quantity of accessory devices sharing the frequencies.

Conventionally, a host device and accessory device will negotiate a set of PHY layer parameters based on highest data rate supported by the host device, the accessory device, and the environment (e.g., the RF space and the physical space through which the host device and accessory device transmit).

An MCS is a set of transmission parameters supported by an AP and a client to adjust the data rate and robustness of transmissions therebetween. An MCS index includes settings for modulation, coding, guard interval, channel width, and other parameters. Higher MCS indexes provide higher data rate but less robust transmissions (e.g., more prone to errors). For example, a coding value for a first MCS index is ½, meaning that each transmission includes 2 bits of data, but only 1 needs to be received for the transmission to succeed. In other examples, a coding value for a second MCS index is ⅚, meaning that each transmission includes 6 bits of data, but 5 of the 6 need to be received for the transmission to succeed. While the second MCS index transmits more information that the first MCS index (i.e., has a higher data rate), a transmission using the second MCS index is more brittle and prone to failure. When the channel quality decreases, such as a fade in SNR, a higher MCS is more likely to result in lost packets, which requires retransmission of the data. Needing to retransmit the data results in an overall slower transmission and increased power consumption.

Figure 4:
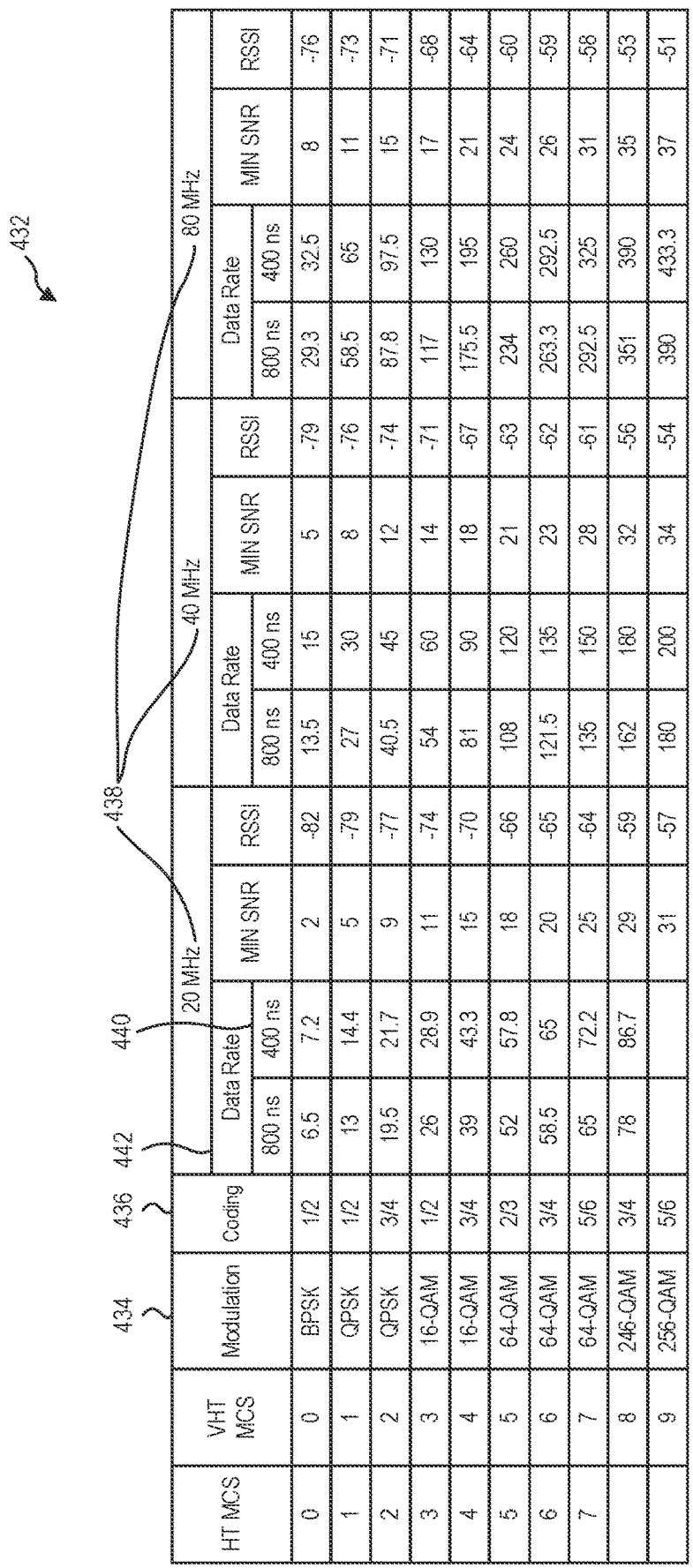
FIG. 4 is a modulation and coding scheme table, according to at least some embodiments of the present disclosure.

FIG. 4 is an example of a MCS table 432 for single spatial stream connections that may be used by a transmitting device according to the present disclosure. In some embodiments, the MCS table provides communication parameters for transmitting data according to various values. In some examples, the MCS table 432 includes parameters for modulation 434, coding 436, channel width 438, guard interval 440 and other parameters that affect the data rate 442 and robustness of the transmission. Narrower data channels width 438 allows for lower data rates 442 but may experience less environmental interference. Lower coding 436 ratios allow for lower data rates 442 but provide more tolerance to data loss during transmission.

Conventionally, the transmitting device transmits according to the assigned Quality of Service, the Destination MAC address, packet length (e.g., data payload length), or combinations thereof. A transmitting device can have stored thereon (such as on the main SOC 322 of the host device 304 of FIG. 3 or in the hardware storage device 208 of the accessory device 202 of FIG. 2) an MCS table 432 with a plurality of transmission parameters based on the selected MCS value.

Upon a transmission failing, the transmitting device will conventionally reduce the MCS by several values to ensure the retransmission has a greater likelihood of success. This brute force technique allows the retransmission to be more robust but slows the transmission time of the initial transmission and slows subsequent transmissions. Systems and methods, according to some embodiments of the present disclosure, allow for proactive adaptation of the MCS or other transmission parameters based on channel quality information before packets are dropped or lost.

Figure 5:
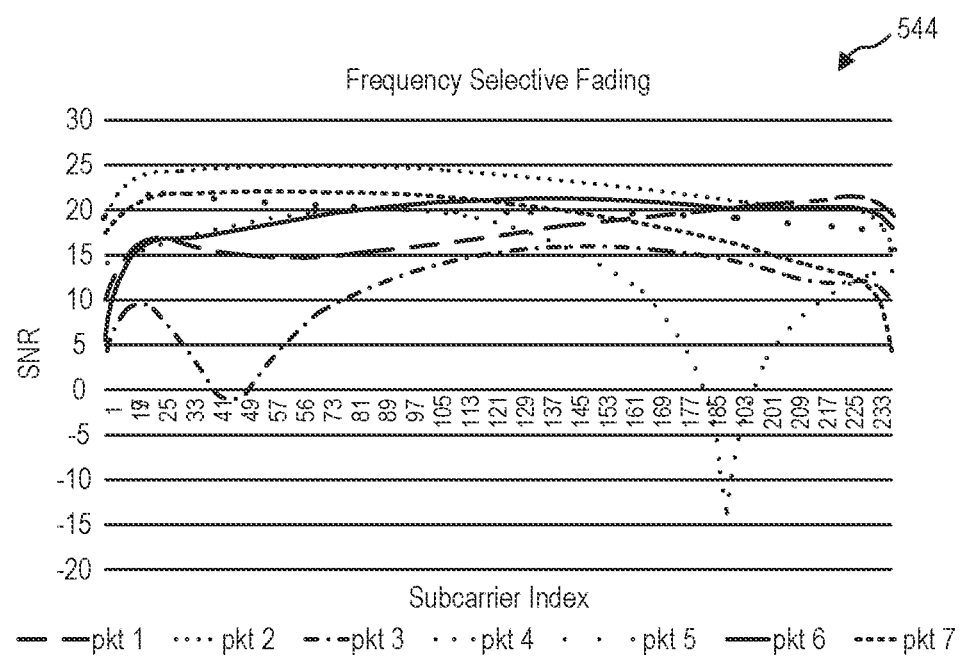
FIG. 5 is a graph illustrating frequency selective fading of signal-to-noise ratio for a plurality of packets, according to at least some embodiments of the present disclosure.

FIG. 5 is a graph 544 illustrating frequency selective fading where packets of data experience different SNRs based on the frequency of the subcarriers on which the packets are transmitted. FIG. 5 reflects a set of simulated packets transmitted according to an IEEE channel model-B, with an MCS 5 and SNR(AWGN) of 22. In this example, packet 3 and packet 4 experience frequency selective fading an result in dropped packets. An exact generalized function of packet transmission success relative to frequency selective SNR and the MCS value is a difficult and/or impossible to model analytically. However, the relationship can be replicated through the use of an ML model, such an artificial neural network (ANN), to develop relationships between CSI, SNR, and other channel quality metrics and the probability of packet transmission success.

A ML model according to the present disclosure refers to a computer algorithm or model (e.g., a classification model, a regression model, a language model, an object detection model) that can be tuned (e.g., trained) based on training input to approximate unknown functions. For example, a machine learning model may refer to a neural network or other machine learning algorithm or architecture that learns and approximates complex functions and generate outputs based on a plurality of inputs provided to the machine learning model. In some implementations, a machine learning system, model, or neural network described herein is an artificial neural network. In some implementations, a machine learning system, model, or neural network described herein is a convolutional neural network. In some implementations, a machine learning system, model, or neural network described herein is a recurrent neural network. In at least one implementation, a machine learning system, model, or neural network described herein is a Bayes classifier. As used herein, a "machine learning system" may refer to one or multiple machine learning models that cooperatively generate one or more outputs based on corresponding inputs. For example, a machine learning system may refer to any system architecture having multiple discrete machine learning components that consider different kinds of information or inputs. In at least one embodiment, the ML model is a supervised or semi-supervised model that is trained using a plurality of known user behaviors and/or known accessory device usage information.

Most radios do not measure or provide the SNR as a function of sub-carriers, i.e., SNR(f). However, reported CQI values, such as CSI and SNR, can be used to estimate the SNR(f) by using a normalized CSI and scaling the normalized CSI with SNR according to:

$$SNR(f_i) = SNR * |CSI(f_i)|^2 / E$$

$$E = \frac{1}{N} \sum |CSI(f_i)|^2$$

As described in relation to FIG. 5, the probability of packet success is related to the SNR(f), and, in some embodiments, an ML model is trained to correlate the probability of packet success to the SNR(f). In some embodiments, the ML model further considers the packet length in the probability of packet success, as well.

Figure 6:
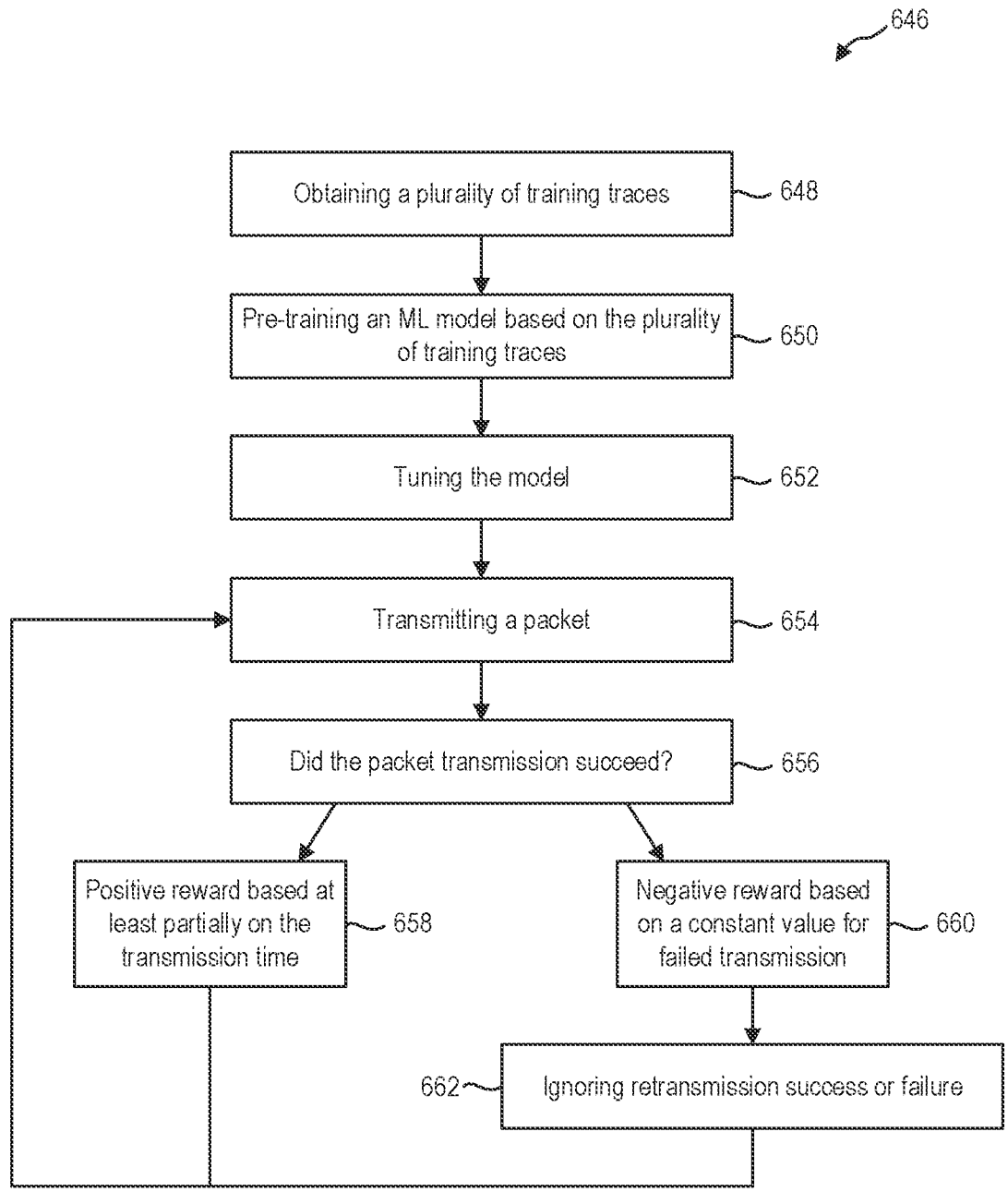
FIG. 6 is a flowchart illustrating a method of managing wireless communication between electronic devices, according to at least some embodiments of the present disclosure.

Referring now to FIG. 6, in some embodiments, a method 646 of training the ML model includes obtaining a plurality of training traces at 648. In some embodiments, obtaining a plurality of training traces includes transmitting a plurality of packets from a first electronic device to a second electronic device, where each packet is transmitted on a different subcarrier and/or different transmission parameters. The second electronic device can return an acknowledgement transmission to confirm the receipt and/or condition of the transmission. The results of the test packets can train the ML model based on the subcarriers and transmission parameters that produce the greatest likelihood of success or failure of the packet.

In some embodiments, obtaining a plurality of training traces includes simulating at least a portion of the plurality of training traces. In some embodiments, obtaining a plurality of training traces includes accessing online training data from a remote server or other storage device, such as via the access point 318 of FIG. 3.

The method 646 further includes pre-training the ML model with the plurality of training traces at 650. In some embodiments, pre-training the ML model with the plurality of training traces includes initializing the ML model with a default model that is pre-trained using the plurality of training traces. The default model may be accessed from a remote server or other storage device. In other examples, the default model may be accessed from a local hardware storage device, such as being installed locally on the electronic device for initial use.

After pre-training the ML model using the plurality of training traces, either locally or accessing a default model pre-trained using the plurality of training traces, the method 646 further includes tuning the ML model at 652. In at least one embodiment, tuning the ML model includes using reinforcement learning to adjust the ML model based at least partially on on-going feedback to the ML model. The reinforcement learning may include transmitting a packet at 654 and checking whether the packet transmission succeeded at 656.

The reinforcement learning-based tuning uses a reward system based on the results of the packet transmissions. For each packet transmission, the transmission parameters, packet length, and CQI (such as CSI, SNR, RSSI, etc.) are collected, and the results of the packet transmission are recorded. When a packet transmission succeeds, a positive reward is produced at 658. The positive reward is based at least partially on the transmission time of the successful transmission. In some embodiments, the reinforcement learning tunes the ML model toward the lowest reward values (e.g., lower is better). In some embodiments, the reward is the transmission time of the successful transmission in microseconds.

When the packet transmission fails, a negative reward is produces at 660. For example, the negative reward is a large value, and may be a constant, that informs the ML model that the combination of the transmission parameters, packet length, and CQI produced an undesirable result. In at least one example, the negative reward is 10000, which would correlate to a transmission time of 0.1 seconds (orders of magnitude greater than a successful transmission).

In some embodiments, the method 646 further includes ignoring retransmission successes or failures at 662 to ensure that the reinforcement learning tunes the ML model based on the results of only the first transmission attempts. Because retransmissions can include lowering the MCS by multiple rates (and often overcompensating) to ensure a successful transmission, the results of the retransmission attempts may skew the tuning of the ML model for initial transmission information.

In some embodiments, the ML model uses a federated model stored on a remote server and accessible by host devices connected to the remote server by a network. In some embodiments, a host device has a local model stored on a hardware storage device of the host device, which the host device tunes for the local environment of the host device, as described herein. The host device may communicate with the federalized model stored on the server to contribute the additional reinforcement learning tuning to the federalized model. In doing so, the federalized model becomes refined over time with real-world applications of local models in user's homes or offices. In some embodiments, a host device can initialize a local model by accessing the federalized model as a pre-trained model, and the host device can tune the pre-trained model to the local environment.

Figure 2:
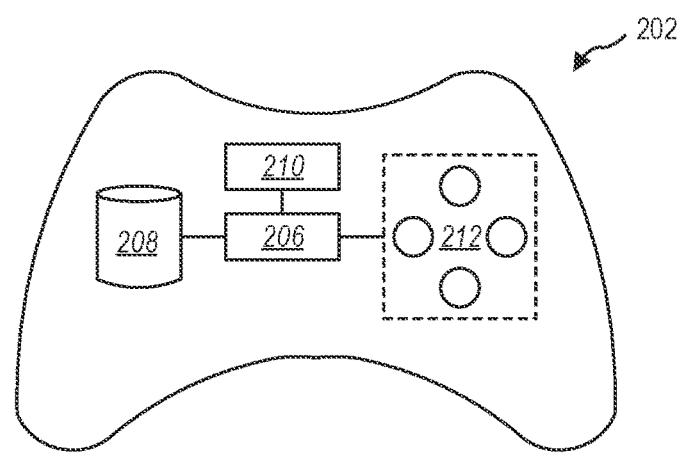
FIG. 2 is a schematic representation of an accessory device, according to at least some embodiments of the present disclosure.
Figures 1, 2, 7:
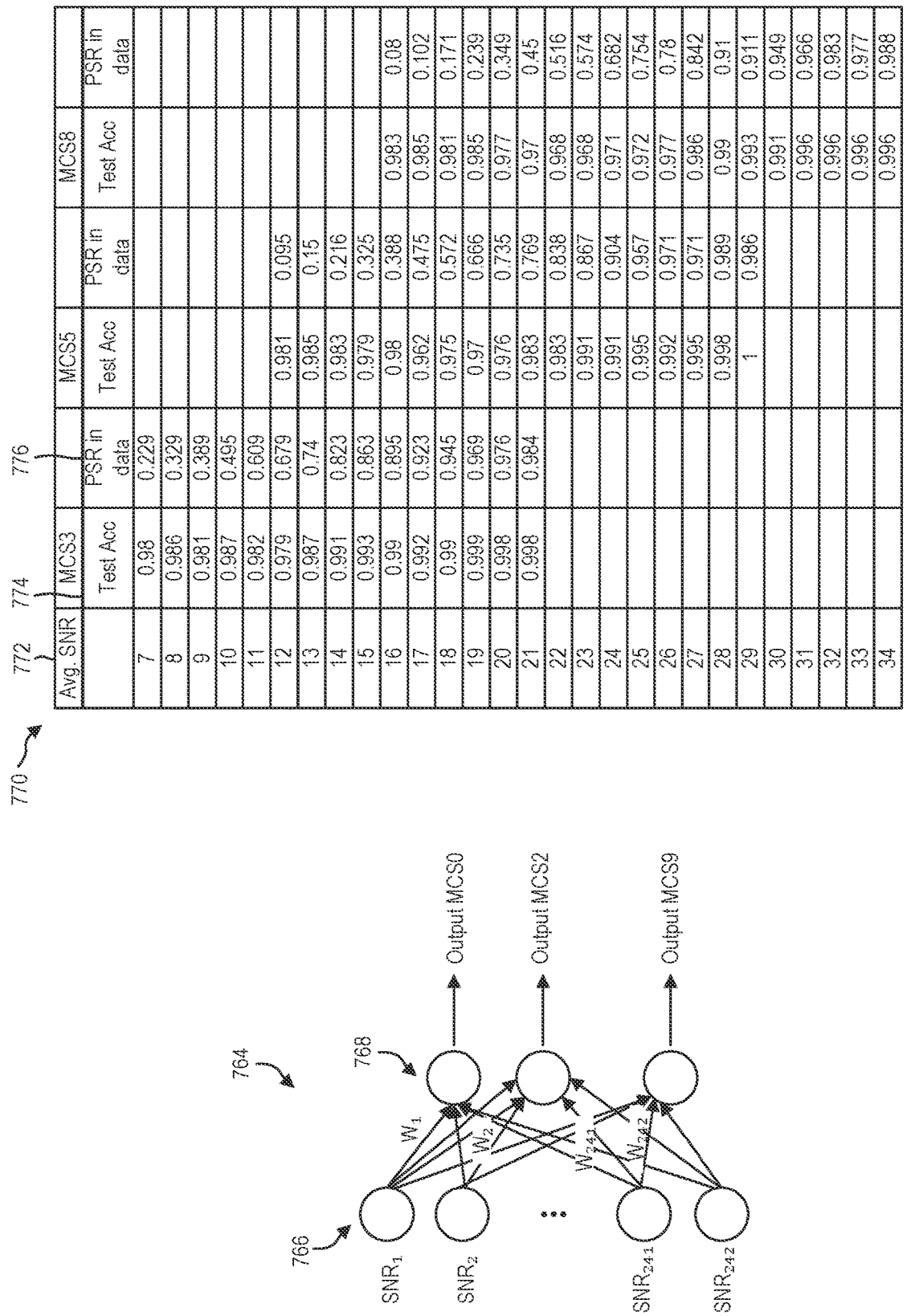

FIG. 7-1 and FIG. 7-2 illustrate an example of an ML model trained and tested during development of some embodiments. The ML model 764 of FIG. 7-1 is illustrated schematically with input nodes 766 which receive input of the computed SNR(f) or other per subcarrier CQI. The per subcarrier inputs are processed by the ML model 764 to produce output nodes 768 with output MCS values. In the illustrated embodiment, the input nodes 766 include one input node for each subcarrier, while in other embodiments, the input nodes 766 may bin subcarriers into a lesser quantity of vectors to reduce computational overhead, such as binning the input values within ranges allowing, for example, 10 input nodes 766.

In some embodiments, the output nodes 768 are at least partially dependent on the CQI (such as SNR), the packet length, data type, etc. to provide a prediction of the success rate of a particular packet transmitted on a particular subcarrier (or bin of subcarriers) based on the most recent CQI of the local RF environment. In at least one embodiment, the CQI received from a recent transmission is outdated and representative of the state of the RF environment of a transmission period prior to the new transmission. For example, if a host device receives transmissions each 8 ms, the output MCS may be based on the condition of the channel 8 ms or 16 ms ago. In other examples with longer transmission intervals, the CQI received in the previous transmissions may be more outdated. In such embodiments, the ML model may compare the CQI of previous transmissions (or transmission intervals) to determine a trend or pattern in the CQI and proactively estimate the current CQI at the time of the next transmission being prepared.

FIG. 7-2 is a table 770 illustrating a portion of the results of an ML model according to the embodiment described in relation to FIG. 7-1. The input SNR 772 is illustrated in line with the Test accuracy 774 and the packet success rate 776. As illustrated in FIG. 7-2, changing the MCS value changes the PSR 776. In examples with a PSR 776 of approximately 0.50, the likelihood of any single packet transmitted with the associated SNR 772 succeeding is equal to the likelihood of the packet failing. However, the ML model demonstrates greater than 96% accuracy in the Test Accuracy 774 at predicting whether any specific packet with those transmission conditions will succeed. The ML model can, therefore, be reasonably relied upon to determine the MCS needed to transmit a packet at least partially based on the calculated or known SNR.

Figure 8:
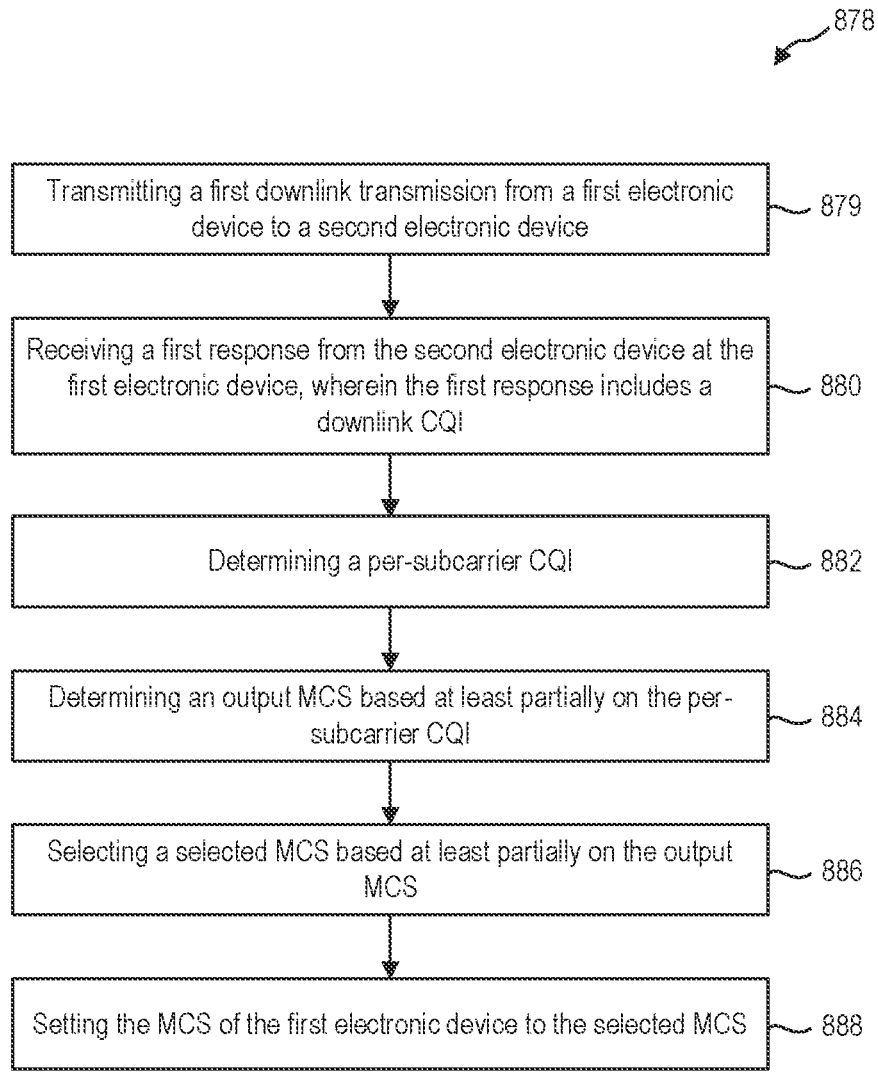
FIG. 8 is a flowchart illustrating a method of managing wireless communications from a first electronic device, according to at least some embodiments of the present disclosure.

Embodiments of an ML model according to the present disclosure can be used to proactively adjust the MCS (or other transmission parameters) of a transmission based on current or recent CQI received in a recent transmission (or history of recent transmissions). FIG. 8 is a flowchart illustrating an embodiment of a method 878 for proactively adapting the downlink MCS for a first electronic device communicating with a second electronic device. In some embodiments, the method 878 includes transmitting a first downlink transmission to the second electronic device at 879. In some embodiments, the method 878 includes receiving a first response from the second electronic device (e.g., an accessory device) at the first electronic device at 880. The first response includes CQI. Different radios may collect and/or transmit different CQI. In some embodiments, the CQI includes the CSI. In some embodiments, the CQI includes SNR. In some embodiments, the CQI includes RSSI. In some embodiments, the first response includes a simplified CQI vector that is based at least partially on and/or calculated from one or more of the CSI, SNR, RSSI, or other measurements of channel quality.

The method 878 includes determining a per subcarrier CQI based at least partially on the received CQI in the first response at 882. In at least one example, the per-subcarrier CQI includes the SNR(f), as described herein. In some embodiments, the per-subcarrier CQI is determined in an application layer of the first electronic device. In some embodiments, the per-subcarrier CQI is determined in the radio layer of the first electronic device.

The method 878 further includes determining an output MCS based at least partially on the per-subcarrier CQI at 884. For example, determining the output MCS may include inputting the per-subcarrier CQI into an ML model. In at least one embodiment, determining the output MCS includes inputting the SNR(f) into an ML model. In some embodiments, the ML model has a conversion for each input value of the per-subcarrier CQI. In other embodiments, the ML model bins the per-subcarrier CQI into a lesser quantity of conversions than the number of subcarriers.

The output MCS obtained at 884 is then used, in some embodiments, to select an MCS for future transmissions at 886. In some embodiments, the selected MCS is an output MCS with a packet success rate above a threshold value. In some embodiments, the selected MCS is an output MCS with a packet success rate above a threshold value based at least partially on the type of data being transmitted in the packet. For example, controller state data (e.g., button presses, thumbstick position) requires a reliability of at least 99.99% and selecting the selected MCS at 886 includes selecting an MCS with a packet success rate predicted to be over 99.99%. In other examples, game audio data (e.g., game audio transmitted to a headset) requires a reliability of at least 99.0% and selecting the selected MCS at 886 includes selecting an MCS with a packet success rate predicted to be over 99.0%. In yet other examples, chat audio data (e.g., user-to-user communication audio) requires a reliability of at least 99.9% and selecting the selected MCS at 886 includes selecting an MCS with a packet success rate predicted to be over 99.9%.

In some embodiments, selecting the selected MCS at 886 includes determining a trend in the per-channel CQI and/or a trend in the predicted packet success rate to estimate the real-time CQI based on the historical CQI received during recent downlink transmissions. In some embodiments, the historical CQI includes the most recent CQI and at least the prior CQI received immediately prior to the most recent CQI. In some embodiments, the historical CQI includes the most recent three CQI received. The method 878 includes setting the MCS of the first electronic device to the selected MCS at 888.

Figure 9:
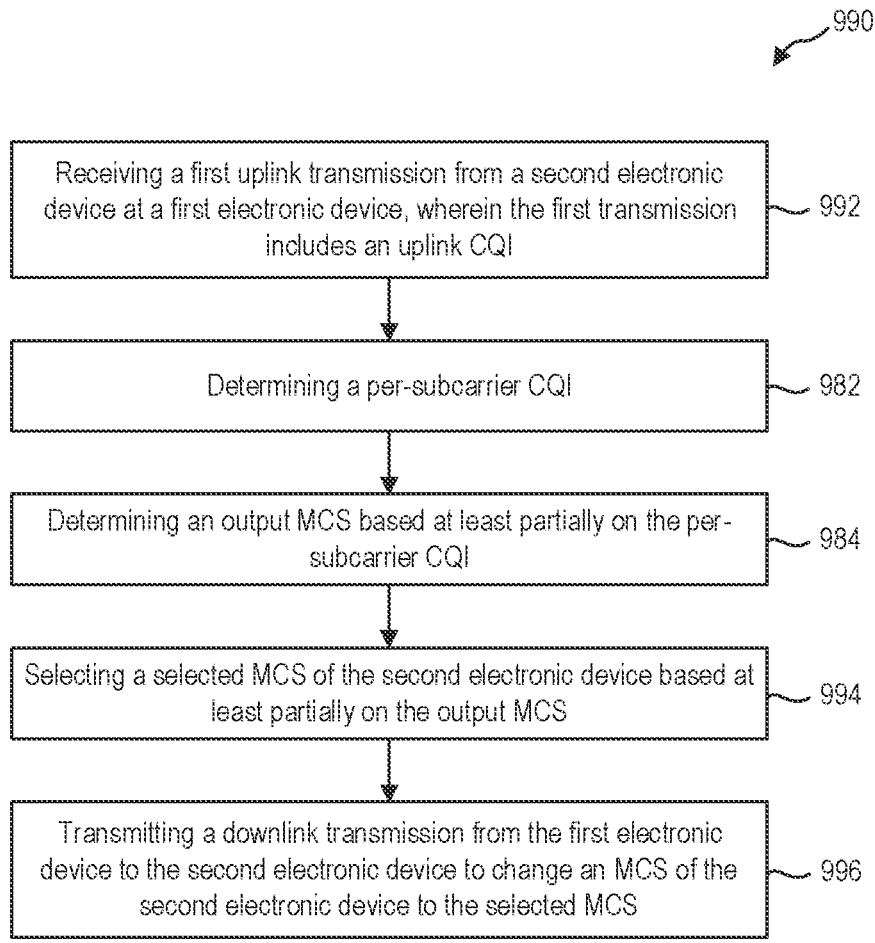
FIG. 9 is a flowchart illustrating a method of managing wireless communications from a second electronic device, according to at least some embodiments of the present disclosure.

FIG. 9 is a flowchart illustrating an embodiment of a method 990 for proactively adapting the uplink MCS for a first electronic device communicating with a second electronic device. In some embodiments, the method 990 includes receiving a first transmission from a second electronic device (e.g., an accessory device) at the first electronic device at 992. The first uplink transmission includes CQI. Different radios may collect and/or transmit different CQI. In some embodiments, the CQI includes the CSI. In some embodiments, the CQI includes SNR. In some embodiments, the CQI includes RSSI. In some embodiments, the first transmission includes a CQI vector that is based at least partially on and/or calculated from one or more of the CSI, SNR, RSSI, or other measurements of channel quality.

The method 990 includes determining a per subcarrier CQI based at least partially on the received CQI in the first uplink transmission at 982. In at least one example, the per-subcarrier CQI includes the SNR(f), as described herein. In some embodiments, the per-subcarrier CQI is determined in an application layer of the first electronic device. In some embodiments, the per-subcarrier CQI is determined in the radio layer of the first electronic device.

The method 990 further includes determining an output MCS based at least partially on the per-subcarrier CQI at 984. For example, determining the output MCS may include inputting the per-subcarrier CQI into an ML model. In at least one embodiment, determining the output MCS includes inputting the SNR(f) into an ML model. In some embodiments, the ML model has a conversion for each input value of the per-subcarrier CQI. In other embodiments, the ML model bins the per-subcarrier CQI into a lesser quantity of conversions than the number of subcarriers.

The output MCS obtained at 984 is then used, in some embodiments, to select an MCS for future uplink transmissions at 994. In some embodiments, the selected MCS is an output MCS with a packet success rate above a threshold value. In some embodiments, the selected MCS is an output MCS with a packet success rate above a threshold value based at least partially on the type of data being transmitted in the packet. For example, controller state data (e.g., button presses, thumbstick position) requires a reliability of at least 99.99% and selecting the selected MCS at 994 includes selecting an MCS with a packet success rate predicted to be over 99.99%. In other examples, game audio data (e.g., game audio transmitted to a headset) requires a reliability of at least 99.0% and selecting the selected MCS at 994 includes selecting an MCS with a packet success rate predicted to be over 99.0%. In yet other examples, chat audio data (e.g., user-to-user communication audio) requires a reliability of at least 99.9% and selecting the selected MCS at 994 includes selecting an MCS with a packet success rate predicted to be over 99.9%.

In some embodiments, selecting the selected MCS at 994 includes determining a trend in the per-channel CQI and/or a trend in the predicted packet success rate to estimate the real-time CQI based on the historical CQI received during recent transmissions. In some embodiments, the historical CQI includes the most recent CQI and at least the prior CQI received immediately prior to the most recent CQI. In some embodiments, the historical CQI includes the most recent three CQI received.

The method 990 further includes transmitting a downlink transmission from the first electronic device to the second electronic device to change an MCS of the second electronic device to the selected electronic device at 996. In some embodiments, the downlink transmission is a trigger frame or included in a trigger frame, such as when the first electronic device and second electronic device are communicating via WIFI 802.11ax protocols. In some embodiments, the downlink transmission is a scheduled periodic transmission, such as when the first electronic device and second electronic device are communicating via WIFI 802.11n protocols.

Figure 10:
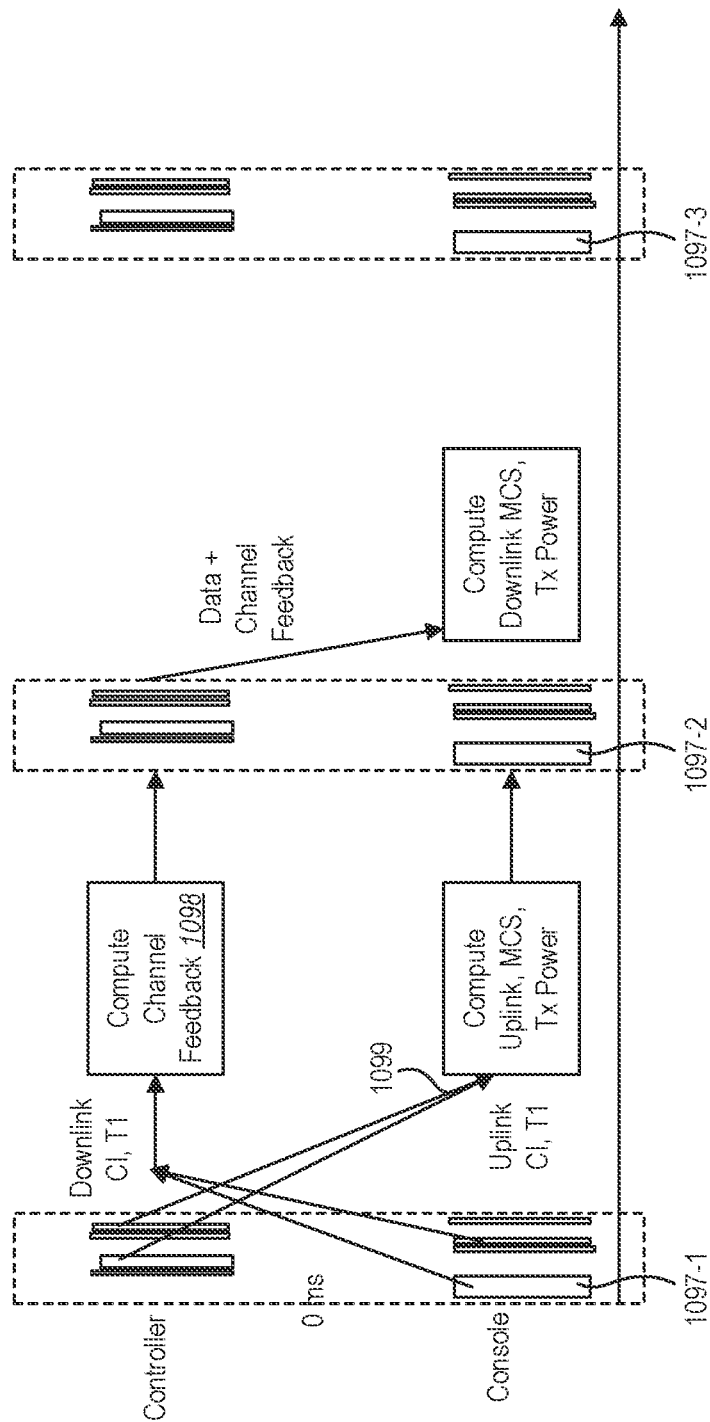
FIG. 10 is a timing diagram illustrating an embodiment of communication timing, according to at least some embodiments of the present disclosure.

FIG. 10 is an example timing of proactively adjusting the MCS of a host device and/or an accessory device communicating via 802.11ax timing conventions. The host device (i.e., console) communicates a downlink first trigger frame 1097-1. In some embodiments, the trigger frames 1097-1, 1097-2 are sent at equal timing intervals, such as every 8 ms. The accessory device (i.e., accessory device) computes a channel feedback 1098 based at least partially on the CQI of the downlink communication (such as the trigger frame 1097). The host device receives an uplink transmission 1099 and computes the uplink MCS, according to the methods described herein, while the accessory device computes the channel feedback 1098.

The second trigger frame 1097-2 communicates a selected uplink MCS to the accessory device, and the accessory device communicates the channel feedback 1098 to the host device at the second timing interval. The host device can then use the channel feedback 1098 to proactively adapt the downlink MCS according to the methods described herein for the third trigger frame 1097-3.

INDUSTRIAL APPLICABILITY

The present disclosure generally relates to systems and methods for communicating data wirelessly between electronic devices. In some embodiments, systems and methods according to the present disclosure relate to communicating data wirelessly between a host device and an accessory device. In some embodiments, the accessory device is an electronic device that communicates data with the host devices for processing of the data at the host device. A variety of accessory devices including different radios and capabilities may be in data communication with the host device at a single time.

A user interacts with the accessory device to provide inputs to the host device and/or receive information from the host device. For example, an accessory device such as a game controller may receive manual inputs from the user on one or more buttons, switches, sticks, etc. and relay the state data to the host device. In another example, an accessory device such as a headset may receive audio data from the host device and play audio sounds to the user. In at least one example, the accessory device is a game controller that both transmits state data (related to user inputs) and chat audio data (collected by the game controller) to the host device and receives game haptic data and/or game audio data from the host device, which may be subsequently generated for the user by the accessory device.

In some instances, the radio frequency (RF) space in which the host device and accessory device(s) communicate changes with time. The channel quality is affected by the physical relationship of the radio of the host device and the radio accessory device, as well as the presence of other radios and/or other objects in the environment that may adversely impact the transmission of electromagnetic signals through the environment. For example, a user may physically move an accessory device relative to the host device. In another example, another radio may move or transmit in the RF space, producing interference on the same channels or frequencies. In another example, a person may walk between the host device and the accessory device. In a particular example, a user is holding a game controller while playing a video game, and the user moves the game controller relative to the host device (e.g., the game console) in both translation and rotation, while other devices, such as the user's computer, tablet, or smartphone generate additional traffic in the RF space.

In some embodiments, systems and methods according to the present disclosure allow for communications between the host device and the accessory device to transmit channel quality information (CQI) periodically and/or with each communication. In some embodiments, the CQI allows the host device and/or the accessory device to proactively change a modulation and coding scheme (MCS) for subsequent transmissions to provide communications with lower latency, higher reliability, lower power consumption, or combinations thereof.

In some embodiments, accessory devices, such as game controllers, speakers, headsets, keyboards, joysticks, and other human interface devices (HID) pair to a host device and share a bandwidth for communication with the host device through time multiplexing.

In some embodiments, an accessory device includes a processor in communication with a hardware storage device. The hardware storage device can be any non-transient computer readable medium that may store instructions thereon. The hardware storage device may be any type of solid-state memory; volatile memory, such as static random access memory (SRAM) or dynamic random access memory (DRAM); non-volatile memory, such as read-only memory (ROM) including programmable ROM (PROM), erasable PROM (EPROM) or EEPROM; magnetic storage media, such as magnetic tape; a platen-based storage device, such as hard disk drives; optical media, such as compact discs (CD), digital video discs (DVD), Blu-ray Discs, or other optical media; removable media such as USB drives; non-removable media such as internal SATA or non-volatile memory express (NVMe) style NAND flash memory; or any other non-transient storage media. The hardware storage device includes instruction stored thereon that, when executed by the processor, cause the accessory device to perform any method or part of a method described herein.

The accessory device further includes a wireless communication device, such as a 802.11ax RF transceiver or an 802.11n RF transceiver, that allows wireless transmission and receipt of data to the host device and/or control device. In some embodiments, the accessory device has a plurality of wireless communication devices that provide communication at different frequencies or power levels to communicate with different host devices and/or control devices.

The data channel provides communication of state data, audio data, and other frequent communications between the accessory device and a host device. In some embodiments, the accessory device also communicates with the host device to provide instructions to the accessory device. In some embodiments, the communications between the accessory device and the host device may broadcast CQI, such as channel state information (CSI), signal-to-noise ratio (SNR), RSSI signal strength, latency information, or other information relevant to the quality of the data transmission on the channel. In some embodiments, the accessory device has at least one input mechanism locally on the accessory device. In embodiments with a control channel, the control channel allows for the communication of latency-tolerant data transmission, while the data channel handles latency-critical information.

As the data channel handles latency-critical information, additional accessory devices sharing the bandwidth may create delays in transmission due to time multiplexing. In a conventional wireless communication system, a first electronic device (e.g., a host device) transmits to a second electronic device (e.g., an accessory device), and, upon receipt of the transmission, the second electronic device transmits an acknowledgment back to the first electronic device. The first electronic device communicates with the second electronic device to select the highest MCS supported by both of the electronic devices to provide the fastest transmissions therebetween. When a transmission fails, no acknowledgement is received at the first electronic device, and the first electronic device will, conventionally, decrease the MCS to retransmit the transmission with a slower MCS, which is more reliable and robust than a higher MCS.

In some embodiments, a system includes a host device (e.g., a game console) in communication with a first accessory device via an accessory radio. The host device is also in data communication with a network through an access point via a network radio. A main processor or main SOC of the host device is indirectly connected to the network radio and accessory radio on the through Peripheral Component Interconnect Express (PCIe) or another hardware connection standard. In some embodiments, the main SOC includes a hardware storage device with instructions stored thereon that, when executed by a processor, cause the host device to perform any method or part of method described herein. In other embodiments, the host device includes a hardware storage device in data communication with the main SOC or processor with instructions stored thereon that, when executed by a processor, cause the host device to perform any method or part of method described herein.

The Low Power Radio Control ASIC is a device that provides a PCIe pass-through using a non-transparent bridge topology when operating normally. In a low power state (e.g., regulatory-standby), the main SOC will be powered off and network control will be managed by the low power radio control ASIC. In this state, the PCIe link will not be used as a pass-through to the main SOC, rather the low power radio control ASIC will manage all network connectivity. The low power radio control ASIC may manage wake events and filter network traffic while also ensuring network functionality is maintained. The low power radio control ASIC may use a processor and embedded SRAM or other memory to host enough of the network functionality to respond to certain events and wake the main SOC. During a low power mode, the accessory radio may not be managed by the low power radio control ASIC. Waking a console in a low power state from the first accessory device will rely on the accessory radio responding to a wake signal or beacon from the accessory device and then alerting the main SOC via an in-band or out-of-band signal to wake.

In some embodiments, the host device establishes a first data channel between the first accessory device (and wireless communication device thereof) and the accessory radio of the host device. In some embodiments, a control channel is also established using the accessory radio. The first data channel carries latency-sensitive information between the first accessory device and the host device to provide the user with responsive and immersive interaction with a host application running on (or accessed through) the host device. For example, some game consoles or personal computers can render game applications and the game environments thereof at framerate at or above 120 frames per second. In such examples, each frame lasts only 8.33 milliseconds (ms). In another example, a game environment rendered at 60 FPS has a 16.67 ms frame time. Delays in communications over the data channel can therefor cause inputs to be received after the intended state of the game environment. In a particular example, a 30 ms delay in communicating a user input can cause the user input to arrive at the host device two to three frames after the button is pressed by the user.

In conventional systems using time multiplexing, additional devices using the frequencies of the first data channel can cause traffic or congestion on the first data channel that slows the transmission of the data. For example, multiple accessory devices sharing the bandwidth for data channels with the accessory radio can cause additional delays. In other examples, devices or radios broadcasting on the same frequency that are not part of the system can cause additional delays in communication. For at least this reason, reliable transmissions that minimize the transmission time and retransmissions of data improve performance of the individual communications, as well as the communications of the system, as a whole.

The first accessory device transmits user input data, such as input device state data, to the host device via the first data channel. In some embodiments, the first accessory device is in wired data communication with a second accessory device. The host device communicates other data, such as game audio data, to the first accessory device to be subsequently transmitted to the second accessory device via the first accessory device. The first accessory device is also configured to receive data from the second accessory device, such as chat audio data, to be wirelessly transmitted to the host device via the first data channel. In some embodiments, the first data channel, therefore, is used to communicate additional different types of data for two different accessory devices (i.e., the first accessory device and second accessory device). The different types of data may have different priorities and/or latency dependencies.

In some embodiments, the first accessory device is in wireless data communication with the second accessory device. A relay transmission may be received by the first accessory device from the host device and relayed by the first accessory device to the second accessory device. In some embodiments, the relay transmission is transmitted by the first accessory device to the second accessory device with a different transmission policy than that used by the host device to transmit the relay transmission to the first accessory device. In some embodiments, the different transmission policy includes a different modulation and coding scheme (MCS) index.

In some embodiments, a third accessory device is in wireless data communication with the host device via the accessory radio while a fourth accessory device is also in wireless data communication with the host device via the accessory radio. The third accessory device and fourth accessory device illustrate an embodiment of a hub-spoke model for network topology. A hub-spoke model for a system requires the establishment of a different data channel for each accessory device with the host device. The third accessory device and fourth accessory device are associated as a pairing that have associated information, such as haptic information sent to the third accessory device via the second data channel and game audio information, which is intended to be synchronized to the haptic information, is sent to the fourth accessory device via the third data channel.

In other embodiments, a mesh-type network allows the third accessory device to act as a node relay to the fourth accessory device (e.g., a game controller acting as a node relay to a headset). In some embodiments, a mesh introduces latency and complications in mesh routing, mesh security, and mesh reliability. A mesh also complicates predictable and sustained bandwidth quality of service. However, a hub-spoke model introduces many individual data channels to communicate with the host device. A game console may communicate with 8 or more accessory devices located in a small area in the example of local or "couch" multiplayer events. In such examples, conventional time-based multiplexing or wait-to-talk communication can introduce delays, which increase with the quantity of accessory devices sharing the frequencies.

Conventionally, a host device and accessory device will negotiate a set of PHY layer parameters based on highest data rate supported by the host device, the accessory device, and the environment (e.g., the RF space and the physical space through which the host device and accessory device transmit).

An MCS is a set of transmission parameters supported by an AP and a client to adjust the data rate and robustness of transmissions therebetween. An MCS index includes settings for modulation, coding, guard interval, channel width, and other parameters. Higher MCS indexes provide higher data rate but less robust transmissions (e.g., more prone to errors). For example, a coding value for a first MCS index is ½, meaning that each transmission includes 2 bits of data, but only 1 needs to be received for the transmission to succeed. In other examples, a coding value for a second MCS index is ⅚, meaning that each transmission includes 6 bits of data, but 5 of the 6 need to be received for the transmission to succeed. While the second MCS index transmits more information that the first MCS index (i.e., has a higher data rate), a transmission using the second MCS index is more brittle and prone to failure. When the channel quality decreases, such as a fade in SNR, a higher MCS is more likely to result in lost packets, which requires retransmission of the data. Needing to retransmit the data results in an overall slower transmission and increased power consumption.

In some embodiments, an MCS table for single spatial stream connections may be used by a transmitting device according to the present disclosure. In some embodiments, the MCS table provides communication parameters for transmitting data according to various values. In some examples, the MCS table includes parameters for modulation, coding, channel width, guard interval and other parameters that affect the data rate and robustness of the transmission. Narrower data channels width allows for lower data rates but may experience less environmental interference. Lower coding ratios allow for lower data rates but provide more tolerance to data loss during transmission.

Conventionally, the transmitting device transmits according to the assigned Quality of Service, the Destination MAC address, packet length (e.g., data payload length), or combinations thereof. A transmitting device can have stored thereon (such as on the main SOC of the host device or in the hardware storage device of the accessory device) an MCS table with a plurality of transmission parameters based on the selected MCS value.

Upon a transmission failing, the transmitting device will conventionally reduce the MCS by several values to ensure the retransmission has a greater likelihood of success. This brute force technique allows the retransmission to be more robust but slows the transmission time of the initial transmission and slows subsequent transmissions. Systems and methods, according to some embodiments of the present disclosure, allow for proactive adaptation of the MCS or other transmission parameters based on channel quality information before packets are dropped or lost.

An exact generalized function of packet transmission success relative to frequency selective SNR and the MCS value is a difficult and/or impossible to model analytically. However, the relationship can be replicated through the use of an ML model, such an artificial neural network (ANN), to develop relationships between CSI, SNR, and other channel quality metrics and the probability of packet transmission success.

A ML model according to the present disclosure refers to a computer algorithm or model (e.g., a classification model, a regression model, a language model, an object detection model) that can be tuned (e.g., trained) based on training input to approximate unknown functions. For example, a machine learning model may refer to a neural network or other machine learning algorithm or architecture that learns and approximates complex functions and generate outputs based on a plurality of inputs provided to the machine learning model. In some implementations, a machine learning system, model, or neural network described herein is an artificial neural network. In some implementations, a machine learning system, model, or neural network described herein is a convolutional neural network. In some implementations, a machine learning system, model, or neural network described herein is a recurrent neural network. In at least one implementation, a machine learning system, model, or neural network described herein is a Bayes classifier. As used herein, a "machine learning system" may refer to one or multiple machine learning models that cooperatively generate one or more outputs based on corresponding inputs. For example, a machine learning system may refer to any system architecture having multiple discrete machine learning components that consider different kinds of information or inputs. In at least one embodiment, the ML model is a supervised or semi-supervised model that is trained using a plurality of known user behaviors and/or known accessory device usage information.

Most radios do not measure or provide the SNR as a function of sub-carriers, i.e., SNR(f). However, reported CQI values, such as CSI and SNR, can be used to estimate the SNR(f) by using a normalized CSI and scaling the normalized CSI with SNR according to:

$$SNR(f_i) = SNR * |CSI(f_i)|^2 / E$$

$$E = \frac{1}{N} \sum |CSI(f_i)|^2$$

In some embodiments, the probability of packet success is related to the SNR(f), and an ML model is trained to correlate the probability of packet success to the SNR(f). In some embodiments, the ML model further considers the packet length in the probability of packet success, as well.

In some embodiments, a method of training the ML model includes obtaining a plurality of training traces. In some embodiments, obtaining a plurality of training traces includes transmitting a plurality of packets from a first electronic device to a second electronic device, where each packet is transmitted on a different subcarrier and/or different transmission parameters. The second electronic device can return an acknowledgement transmission to confirm the receipt and/or condition of the transmission. The results of the test packets can train the ML model based on the subcarriers and transmission parameters that produce the greatest likelihood of success or failure of the packet.

In some embodiments, obtaining a plurality of training traces includes simulating at least a portion of the plurality of training traces. In some embodiments, obtaining a plurality of training traces includes accessing online training data from a remote server or other storage device, such as via an access point.

The method further includes pre-training the ML model with the plurality of training traces. In some embodiments, pre-training the ML model with the plurality of training traces includes initializing the ML model with a default model that is pre-trained using the plurality of training traces. The default model may be accessed from a remote server or other storage device. In other examples, the default model may be accessed from a local hardware storage device, such as being installed locally on the electronic device for initial use.

After pre-training the ML model using the plurality of training traces, either locally or accessing a default model pre-trained using the plurality of training traces, the method further includes tuning the ML model. In at least one embodiment, tuning the ML model includes using reinforcement learning to adjust the ML model based at least partially on on-going feedback to the ML model. The reinforcement learning may include transmitting a packet and checking whether the packet transmission succeeded.

The reinforcement learning-based tuning uses a reward system based on the results of the packet transmissions. For each packet transmission, the transmission parameters, packet length, and CQI (such as CSI, SNR, RSSI, etc.) are collected, and the results of the packet transmission are recorded. When a packet transmission succeeds, a positive reward is produced at 658. The positive reward is based at least partially on the transmission time of the successful transmission. In some embodiments, the reinforcement learning tunes the ML model toward the lowest reward values (e.g., lower is better). In some embodiments, the reward is the transmission time of the successful transmission in microseconds.

When the packet transmission fails, a negative reward is produces. For example, the negative reward is a large value, and may be a constant, that informs the ML model that the combination of the transmission parameters, packet length, and CQI produced an undesirable result. In at least one example, the negative reward is 10000, which would correlate to a transmission time of 0.1 seconds (orders of magnitude greater than a successful transmission).

In some embodiments, the method further includes ignoring retransmission successes or failures to ensure that the reinforcement learning tunes the ML model based on the results of only the first transmission attempts. Because retransmissions can include lowering the MCS by multiple rates (and often overcompensating) to ensure a successful transmission, the results of the retransmission attempts may skew the tuning of the ML model for initial transmission information.

In some embodiments, the ML model uses a federated model stored on a remote server and accessible by host devices connected to the remote server by a network. In some embodiments, a host device has a local model stored on a hardware storage device of the host device, which the host device tunes for the local environment of the host device, as described herein. The host device may communicate with the federalized model stored on the server to contribute the additional reinforcement learning tuning to the federalized model. In doing so, the federalized model becomes refined over time with real-world applications of local models in user's homes or offices. In some embodiments, a host device can initialize a local model by accessing the federalized model as a pre-trained model, and the host device can tune the pre-trained model to the local environment.

In some embodiments, an ML model has input nodes which receive input of the computed SNR(f) or other per-subcarrier CQI. The per-subcarrier inputs are processed by the ML model to produce output nodes with output MCS values. In the illustrated embodiment, the input nodes include one input node for each subcarrier, while in other embodiments, the input nodes may bin subcarriers into a lesser quantity of vectors to reduce computational overhead, such as binning the input values within ranges allowing, for example, 10 input nodes.

In some embodiments, the output nodes are at least partially dependent on the CQI (such as SNR), the packet length, data type, etc. to provide a prediction of the success rate of a particular packet transmitted on a particular subcarrier (or bin of subcarriers) based on the most recent CQI of the local RF environment. In at least one embodiment, the CQI received from a recent transmission is outdated and representative of the state of the RF environment of a transmission period prior to the new transmission. For example, if a host device receives transmissions each 8 ms, the output MCS may be based on the condition of the channel 8 ms or 16 ms ago. In other examples with longer transmission intervals, the CQI received in the previous transmissions may be more outdated. In such embodiments, the ML model may compare the CQI of previous transmissions (or transmission intervals) to determine a trend or pattern in the CQI and proactively estimate the current CQI at the time of the next transmission being prepared.

Embodiments of an ML model according to the present disclosure can be used to proactively adjust the MCS (or other transmission parameters) of a transmission based on current or recent CQI received in a recent transmission (or history of recent transmissions). In some embodiments, a method for proactively adapting the downlink MCS for a first electronic device communicating with a second electronic device includes transmitting a first downlink transmission to the second electronic device. In some embodiments, the method includes receiving a first response from the second electronic device (e.g., an accessory device) at the first electronic device. The first response includes CQI. Different radios may collect and/or transmit different CQI. In some embodiments, the CQI includes the CSI. In some embodiments, the CQI includes SNR. In some embodiments, the CQI includes RSSI. In some embodiments, the first response includes a CQI vector that is based at least partially on and/or calculated from one or more of the CSI, SNR, RSSI, or other measurements of channel quality.

The method includes determining a per-subcarrier CQI based at least partially on the received CQI in the first response at. In at least one example, the per-subcarrier CQI includes the SNR(f), as described herein. In some embodiments, the per-subcarrier CQI is determined in an application layer of the first electronic device. In some embodiments, the per-subcarrier CQI is determined in the radio layer of the first electronic device.

The method further includes determining an output MCS based at least partially on the per-subcarrier CQI. For example, determining the output MCS may include inputting the per-subcarrier CQI into an ML model. In at least one embodiment, determining the output MCS includes inputting the SNR(f) into an ML model. In some embodiments, the ML model has a conversion for each input value of the per-subcarrier CQI. In other embodiments, the ML model bins the per-subcarrier CQI into a lesser quantity of conversions than the number of subcarriers.

The output MCS obtained is then used, in some embodiments, to select an MCS for future transmissions. In some embodiments, the selected MCS is an output MCS with a packet success rate above a threshold value. In some embodiments, the selected MCS is an output MCS with a packet success rate above a threshold value based at least partially on the type of data being transmitted in the packet. For example, controller state data (e.g., button presses, thumbstick position) requires a reliability of at least 99.99% and selecting the selected MCS includes selecting an MCS with a packet success rate predicted to be over 99.99%. In other examples, game audio data (e.g., game audio transmitted to a headset) requires a reliability of at least 99.0% and selecting the selected MCS includes selecting an MCS with a packet success rate predicted to be over 99.0%. In yet other examples, chat audio data (e.g., user-to-user communication audio) requires a reliability of at least 99.9% and selecting the selected MCS includes selecting an MCS with a packet success rate predicted to be over 99.9%.

In some embodiments, selecting the selected MCS includes determining a trend in the per-channel CQI and/or a trend in the predicted packet success rate to estimate the real-time CQI based on the historical CQI received during recent downlink transmissions. In some embodiments, the historical CQI includes the most recent CQI and at least the prior CQI received immediately prior to the most recent CQI. In some embodiments, the historical CQI includes the most recent three CQI received. The method includes setting the MCS of the first electronic device to the selected MCS.

In some embodiments, a method for proactively adapting the uplink MCS for a first electronic device communicating with a second electronic device includes receiving a first transmission from a second electronic device (e.g., an accessory device) at the first electronic device. The first uplink transmission includes CQI. Different radios may collect and/or transmit different CQI. In some embodiments, the CQI includes the CSI. In some embodiments, the CQI includes SNR. In some embodiments, the CQI includes RSSI. In some embodiments, the first transmission includes a CQI vector that is based at least partially on and/or calculated from one or more of the CSI, SNR, RSSI, or other measurements of channel quality.

The method includes determining a per-subcarrier CQI based at least partially on the received CQI in the first uplink transmission. In at least one example, the per-subcarrier CQI includes the SNR(f), as described herein. In some embodiments, the per-subcarrier CQI is determined in an application layer of the first electronic device. In some embodiments, the per-subcarrier CQI is determined in the radio layer of the first electronic device.

The method further includes determining an output MCS based at least partially on the per-subcarrier CQI. For example, determining the output MCS may include inputting the per-subcarrier CQI into an ML model. In at least one embodiment, determining the output MCS includes inputting the SNR(f) into an ML model. In some embodiments, the ML model has a conversion for each input value of the per-subcarrier CQI. In other embodiments, the ML model bins the per-subcarrier CQI into a lesser quantity of conversions than the number of subcarriers.

The output MCS obtained is then used, in some embodiments, to select an MCS for future uplink transmissions. In some embodiments, the selected MCS is an output MCS with a packet success rate above a threshold value. In some embodiments, the selected MCS is an output MCS with a packet success rate above a threshold value based at least partially on the type of data being transmitted in the packet. For example, controller state data (e.g., button presses, thumbstick position) requires a reliability of at least 99.99% and selecting the selected MCS includes selecting an MCS with a packet success rate predicted to be over 99.99%. In other examples, game audio data (e.g., game audio transmitted to a headset) requires a reliability of at least 99.0% and selecting the selected MCS includes selecting an MCS with a packet success rate predicted to be over 99.0%. In yet other examples, chat audio data (e.g., user-to-user communication audio) requires a reliability of at least 99.9% and selecting the selected MCS includes selecting an MCS with a packet success rate predicted to be over 99.9%.

In some embodiments, selecting the selected MCS includes determining a trend in the per-channel CQI and/or a trend in the predicted packet success rate to estimate the real-time CQI based on the historical CQI received during recent transmissions. In some embodiments, the historical CQI includes the most recent CQI and at least the prior CQI received immediately prior to the most recent CQI. In some embodiments, the historical CQI includes the most recent three CQI received.

The method further includes transmitting a downlink transmission from the first electronic device to the second electronic device to change an MCS of the second electronic device to the selected electronic device. In some embodiments, the downlink transmission is a trigger frame or included in a trigger frame, such as when the first electronic device and second electronic device are communicating via WIFI 802.11ax protocols. In some embodiments, the downlink transmission is a scheduled periodic transmission, such as when the first electronic device and second electronic device are communicating via WIFI 802.11n protocols.

The present disclosure relates to systems and methods for communicating data between electronic devices according to at least the examples provided in the sections below:

[A1] In some embodiments, a method of managing wireless communication between electronic devices includes, at a first electronic device, transmitting a first downlink transmission from the first electronic device to a second electronic device and receiving a first response from the second electronic device at the first electronic device, wherein the first response includes a downlink channel quality information (CQI). The method further includes determining a per-subcarrier CQI based at least partially on the downlink CQI and determining an output MCS based at least partially on the per-subcarrier CQI. After determining the output MCS, the method includes selecting a selected modulation and coding scheme (MCS) based at least partially on the output MCS and setting an MCS of the first electronic device to the selected MCS.

[A2] In some embodiments, the first downlink transmission of [A1] is a trigger frame.

[A3] In some embodiments, the downlink CQI of [A1] or [A2] includes channel state information (CSI).

[A4] In some embodiments, the downlink CQI of any of [A1] through [A3] includes at least one signal-to-noise ratio (SNR).

[A5] In some embodiments, determining a per-subcarrier CQI of any of [A1] through [A4] includes calculating a per-subcarrier SNR.

[A6] In some embodiments, determining an output MCS based at least partially on the per-subcarrier CQI of [A1] through [A5] includes inputting the per-subcarrier CQI into a machine learning (ML) model.

[A7] In some embodiments, determining an output MCS based at least partially on the per-subcarrier CQI of [A1] through [A6] includes inputting at least two historical values of the per-subcarrier CQI to estimate a current or future per-subcarrier CQI.

[A8] In some embodiments, determining an output MCS of [A1] through [A7] is further based at least partially on a packet length.

[A9] In some embodiments, determining an output MCS of [A1] through [A8] is further based at least partially on a data type of a packet.

[A10] In some embodiments, the downlink CQI of [A1] through [A9] is a simplified vector based on CSI.

[B1] In some embodiments, a method of managing wireless communication between electronic devices, at a first electronic device, receiving a first uplink transmission from a second electronic device at the first electronic device, wherein the first uplink transmission includes an uplink CQI and determining a per-subcarrier CQI based at least partially on the uplink CQI. The method further includes determining an output MCS based at least partially on the per-subcarrier CQI, selecting a selected MCS of the second electronic device based at least partially on the output MCS, and transmitting a downlink transmission from the first electronic device to the second electronic device to change an MCS of the second electronic device to the selected MCS.

[B2] In some embodiments, the first electronic device of [B1] is a video game console.

[B3] In some embodiments, the second electronic device of [B1] or [B2] is a game controller.

[B4] In some embodiments, determining an output MCS based at least partially on the per-subcarrier CQI of any of [B1] through [B3] includes inputting at least one historical value of the per-subcarrier CQI to estimate a current or future per-subcarrier CQI.

[B5] In some embodiments, the downlink transmission any of [B1] through [B4] is a trigger frame.

[C1] In some embodiments, an electronic device includes a processor, a wireless communication device in data communication with the processor, and a hardware storage device in data communication with the processor. The hardware storage device has instructions stored thereon that, when executed by the processor, cause the electronic device to transmit a first downlink transmission from the electronic device to a second electronic device and receive a first response from the second electronic device at the electronic device, wherein the first response includes a downlink CQI. The instructions further cause the electronic device to determine a per-subcarrier CQI based at least partially on the downlink CQI and determine an output MCS based at least partially on inputting the per-subcarrier CQI to an ML model. The instructions further cause the electronic device to select a selected MCS based at least partially on the output MCS and set the MCS of the first electronic device to the selected MCS.

[C2] In some embodiments, the instructions of [C1] further cause the electronic device to receive a first uplink transmission from a second electronic device at the first electronic device, wherein the first uplink transmission includes an uplink CQI, determine a per-subcarrier CQI based at least partially on the uplink CQI, determine an output MCS based at least partially on inputting the per-subcarrier CQI into the ML mode, select a selected MCS of the second electronic device based at least partially on the output MCS, and transmit a downlink transmission from the first electronic device to the second electronic device to change an MCS of the second electronic device to the selected MCS.

[C3] In some embodiments, the instructions of [C1] or [C2] further cause the electronic device to obtain a plurality of training traces, pre-train an ML model based at least partially on the plurality of training traces, and tune the ML model to produce a tuned ML model.

[C4] In some embodiments, tuning the ML model of [C3] includes using reinforcement learning.

[C5] In some embodiments, tuning the ML model of [C3] or [C4] includes ignoring results of retransmissions The articles "a," "an," and "the" are intended to mean that there are one or more of the elements in the preceding descriptions. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. For example, any element described in relation to an embodiment herein may be combinable with any element of any other embodiment described herein. Numbers, percentages, ratios, or other values stated herein are intended to include that value, and also other values that are "about" or "approximately" the stated value, as would be appreciated by one of ordinary skill in the art encompassed by embodiments of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

A person having ordinary skill in the art should realize in view of the present disclosure that equivalent constructions do not depart from the scope of the present disclosure, and that various changes, substitutions, and alterations may be made to embodiments disclosed herein without departing from the scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the embodiments that falls within the meaning and scope of the claims is to be embraced by the claims.

It should be understood that any directions or reference frames in the preceding description are merely relative directions or movements. For example, any references to "front" and "back" or "top" and "bottom" or "left" and "right" are merely descriptive of the relative position or movement of the related elements.

The present disclosure may be embodied in other specific forms without departing from its characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A method comprising:
   at a first electronic device:
   transmitting a first downlink transmission from the first electronic device to a second electronic device;
   receiving a first response from the second electronic device at the first electronic device, wherein the first response includes downlink channel quality information (CQI);
   determining a per-subcarrier CQI based at least partially on the downlink CQI;
   using a trained machine learning model to predict, based at least partially on the per-subcarrier CQI, packet success probabilities for two or more output modulation and coding schemes;
   choosing a selected modulation and coding scheme from the two or more output modulation and coding schemes based at least partially on the predicted packet success probabilities;
   and
   setting the first electronic device to use the selected modulation and coding scheme.

2. The method of claim 1, wherein the first downlink transmission is a trigger frame.

3. The method of claim 1, wherein the downlink CQI includes channel state information (CSI).

4. The method of claim 1, wherein the downlink CQI includes at least one signal-to-noise ratio (SNR).

5. The method of claim 4, wherein determining a per-subcarrier CQI includes calculating a per-subcarrier SNR.

6. The method of claim 1, wherein the predicted packet success probabilities indicate respective likelihoods that a future packet transmission will succeed using each of the two or more output modulation and coding schemes.

7. The method of claim 1, further comprising:
estimating per-subcarrier signal-to-noise ratios based at least partially on the per-subcarrier CQI; and
inputting the per-subcarrier signal-to-noise ratios to the trained machine learning model,
the trained machine learning model predicting the packet success probabilities based at least partially on the per-subcarrier signal-to-noise ratios.

8. The method of claim 1, further comprising:
inputting a packet length to the trained machine learning model, the trained machine learning model predicting the packet success probabilities based at least partially on the packet length.

9. The method of claim 1, wherein the trained machine learning model predicts the packet success probabilities based at least partially on a data type of a packet to be transmitted in the future using the selected modulation and coding scheme.

10. The method of claim 1, wherein the downlink CQI is a simplified vector based on channel state information.

11. A method comprising:
at a first electronic device:
receiving a first uplink transmission from a second electronic device at the first electronic device, wherein the first uplink transmission includes uplink channel quality information (CQI);
determining a per-subcarrier CQI based at least partially on the uplink CQI;
using a trained machine learning model to predict, based at least partially on the per-subcarrier CQI, packet success probabilities for two or more output modulation and coding schemes;
choosing a selected modulation and coding scheme for the second electronic device from the two or more output modulation and coding schemes based at least partially on the predicted packet success probabilities; and
transmitting a downlink transmission from the first electronic device to the second electronic device, the downlink transmission instructing the second electronic device to use the selected modulation and coding scheme.

12. The method of claim 11, wherein the first electronic device is a video game console.

13. The method of claim 12, wherein the second electronic device is a game controller.

14. The method of claim 11, further comprising:
estimating per-subcarrier signal-to-noise ratios based at least partially on the per-subcarrier CQI; and
inputting the per-subcarrier signal-to-noise ratios to the trained machine learning model,
the trained machine learning model predicting the packet success probabilities based at least partially on the per-subcarrier signal-to-noise ratios.

15. The method of claim 11, wherein the downlink transmission is a trigger frame.

16. An electronic device comprising:
a processor;
a wireless communication device in data communication with the processor; and
a hardware storage device in data communication with the processor, the hardware storage device having instructions stored thereon that, when executed by the processor, cause the electronic device to:
transmit a first downlink transmission from the electronic device to a second electronic device;
receive a first response from the second electronic device at the electronic device, wherein the first response includes downlink channel quality information (CQI);
determine a per-subcarrier CQI based at least partially on the downlink CQI;
use a trained machine learning model to predict, based at least partially on the per-subcarrier CQI, packet success probabilities for two or more output modulation and coding schemes;
choose a selected modulation and coding scheme from the two or more output modulation and coding schemes based at least partially on the predicted packet success probabilities;
set the electronic device to use the selected modulation and coding scheme.

17. The electronic device of claim 16, wherein the instructions further cause the electronic device to:
receive a first uplink transmission from the second electronic device at the first electronic device, wherein the first uplink transmission includes uplink CQI;
determine second per-subcarrier CQI based at least partially on the uplink CQI;
use a trained machine learning model to predict, based at least partially on the second per-subcarrier CQI, second packet success probabilities for the two or more output modulation and coding schemes;
choose a second selected modulation and coding scheme from the two or more output modulation and coding schemes based at least partially on the second predicted packet success probabilities;
and
transmit a downlink transmission from the first electronic device to the second electronic device, the downlink transmission instructing the second electronic device to use the second selected modulation and coding scheme.

18. The electronic device of claim 16, wherein the instructions further cause the electronic device to:
obtain a plurality of training traces;
pre-train the machine learning model to predict the packet success probabilities based at least partially on the plurality of training traces; and
tune the machine model to produce the trained machine learning model.

19. The electronic device of claim 18, wherein the machine learning model includes is tuned using reinforcement learning.

20. The electronic device of claim 19, wherein the machine learning model is tuned by ignoring results of retransmissions.

* * * * *